United States Patent [19]

Swedo et al.

[11] Patent Number: 4,885,091

[45] Date of Patent: * Dec. 5, 1989

[54] PROCESS FOR THE PREPARATION OF CHLORINE-RESISTANT SEMIPERMEABLE MEMBRANES

[75] Inventors: Raymond J. Swedo, Mt. Prospect; Joseph J. Zupancic, Bensenville, both of Ill.

[73] Assignee: Allied-Signal Inc., Morris Township, Morris County, N.J.

[*] Notice: The portion of the term of this patent subsequent to Sep. 20, 2005 has been disclaimed.

[21] Appl. No.: 202,850

[22] Filed: Jun. 1, 1988

Related U.S. Application Data

[63] Continuation-in-part of Ser. No. 898,074, Aug. 20, 1986, Pat. No. 4,772,394, which is a continuation-in-part of Ser. No. 686,497, Dec. 26, 1989, abandoned.

[51] Int. Cl.$^4$ .................... B01D 13/00; B01D 13/04
[52] U.S. Cl. ................... 210/500.37; 264/41
[58] Field of Search ............... 264/45.1, 48, 41, 45.5, 264/46.4, DIG. 48, DIG. 62; 210/500.39, 500.38, 500.37

[56] References Cited

U.S. PATENT DOCUMENTS

| | | | |
|---|---|---|---|
| 4,113,683 | 9/1978 | Kalnin et al. | 264/129 |
| 4,661,254 | 4/1987 | Zupancic et al. | 210/500.39 |
| 4,772,394 | 9/1988 | Swedo et al. | 210/500.38 |

*Primary Examiner*—Frank Sever
*Attorney, Agent, or Firm*—Raymond H. Nelson; Harold N. Wells; Thomas K. McBride

[57] ABSTRACT

Chlorine-resistant semipermeable membranes which comprise an interfacial polymerized reaction product composited on a porous support backing material may be prepared by contacting a porous support material such as polysulfone with an aqueous solution of an aromatic polyamine containing a chlorine substituent on the aromatic ring such as 5-chlor-m-phenylenediamine. The coated support material is then contacted with an organic solvent solution of aromatic polycarboxylic acid chloride such as trimesoyl chloride for a period of time sufficient to form an interfacial polymerized reaction product on the surface of the support material. The resultant semipermeable membrane is then cured at curing conditions to form the desired composite. The resultant membrane composite may be used in separation processes such as desalination of brackish or sea water, the membrane being resistant to attack by chlorine which is present in the water.

29 Claims, No Drawings

PROCESS FOR THE PREPARATION OF CHLORINE-RESISTANT SEMIPERMEABLE MEMBRANES

CROSS-REFERENCE TO RELATED APPLICATIONS

This application is a continuation-in-part of our co-pending application Ser. No. 898,074 filed Aug. 20, 1986 which is a continuation-in-part of application Ser. No. 686,497 filed Dec. 26, 1984, now abandoned, all teachings of which are incorporated herein by reference thereto.

BACKGROUND OF THE INVENTION

The separation of various components found in liquids or gases may be effected in a multitude of processes, the techniques for effecting the separation including ultrafiltration or reverse osmosis. A particular example of the latter type of separation involves a desalination process in which water which is rendered potable or suitable for other purposes is obtained from sea water, contaminated water, brackish water or brine. This process is of especial value in areas of the world where the water found in the area is brackish or is saline in nature. The desalination of this water is necessary in order to provide large amounts of potable or relatively nonsalty water for industrial, agricultural or home use. The desalination of the water is effected by forcing the water through a reverse osmosis membrane whereby the purified water is passed through the membrane and recovered, while the contaminants or salts do not pass through the membrane, thus, in effect, being rejected by the membrane and recovered as the retentate.

A reverse osmosis membrane, in order to be utilized for such a purpose, must possess certain characteristics applicable to the process. For example, the membrane must have a very high salt rejection coefficient. In addition, another important characteristic and a problem which must be addressed when utilizing the membrane, is the ability of the membrane to be resistant to chlorine attack. Another important factor which is present in the use of a reverse osmosis membrane is that said membrane also possess a high flux characteristic, that is, the ability to pass a relatively large amount of water through the membrane at relatively low pressures. If a membrane possesses these desirable characteristics, it will be commercially feasible in its applicability to the desalination process.

Reverse osmosis membranes have been prepared and used from a wide variety of known polymeric materials. While many of these polymeric materials possess the ability of reducing the concentration of a solute to where the salt rejection capability is in excess of 98%, some do not possess the necessary flux rate whereby the volume of water which is required to be produced by the membrane per unit of membrane surface is sufficient for the application of the technology.

As was hereinbefore set forth, many prior U.S. patents describe various membranes which are useful in desalination processes. For example, U.S. Pat. Nos. 3,567,632, 3,600,350, 3,710,945, 3,878,109, 3,904,519, 3,920,612, 3,951,815, 3,993,625, and 4,048,144 illustrate various semipermeable membranes prepared from polyamides. Likewise, U.S. Pat. Nos. 3,260,691 and 3,480,588 disclose coating compositions which are obtained from the condensation products of aromatic primary diamines and aromatic tricarboxylic acid derivatives.

Inasmuch as the semipermeable membrane which is used for the desalination process should be relatively thin in nature in order to provide a desirable flux rate, it is necessary, in many instances, that the reverse osmosis membrane be composited or laminated on a porous backing support material. This porous support backing material should in itself possess certain characteristics which make it desirable for such a use. For example, the porous support material should possess pore sizes which are sufficiently large enough so that the water or permeate can pass through the support without affecting or lessening the flux rate of the entire composite. Conversely speaking, the pore size should not be large enough so that the thin composite semipermeable membrane will tend to fill up or enter into the pores, thus distorting the shape of the thin film membrane with the attendant possibility of rupturing the membrane, thus causing said membrane to lose its effectiveness in the reverse osmosis process.

In addition to the aforementioned U.S. patents, another U.S. patent, namely U.S. Pat. No. 4,277,344, discloses an interfacial synthesized reverse osmosis membrane. This membrane is prepared from a cross-linked interfacially polymerized aromatic polyamine which has been prepared from an essentially monomeric polyacyl halide and an essentially monomeric arylene polyamine. The patent indicates that the acyl halide which is employed as one of the components in the interfacial polymerization reaction should be free of interfering substituents. The patent refers to these substituents as moieties which are capable of interfering with intermolecular amine-carboxylic acid, amide-forming condensation reactions and points out that such interference is generally steric and/or chemically reactive. An example of steric interference or steric hindrance would be the location of a substituent other than hydrogen on a ring position adjacent to an amine group on the polyamine reactant. An example of chemical interference would be the location of an acyl halide reactive substituent on the polyacyl halide or an amine-reactive substituent on the polyamine. The patent further states that such chemical interfering substituents would lead to the formation of internal esters, internal amides, internal salts, or the like, or another possible consequence which would be attendant upon the performance of these moieties would be an unpredictable effect on cross-linked densities.

This patent also states that substituents on the aromatic nucleus other than the amine groups themselves are likely to detract from the performance of the ultimately obtained polymer, even the substituents which are as small as the methyl group, possibly having undesirable effects particularly when substituted on a ring position adjacent to the primary amine group. Thus, it is apparent that this patent teaches away from the presence of substituents on the aromatic ring of the polyamine to prepare a membrane such as that which is obtained when utilizing the components of the present invention.

In addition, the polymerized aromatic polyamine of this patent which may be depicted as follows:

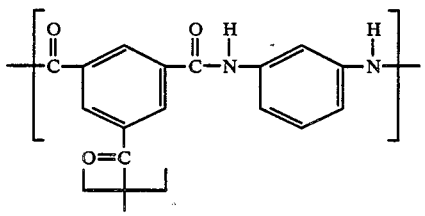

may undergo deliberate chlorination in which it is stated that the chlorination process properly removes unreacted aromatic polyamines to produce a compound depicted as follows:

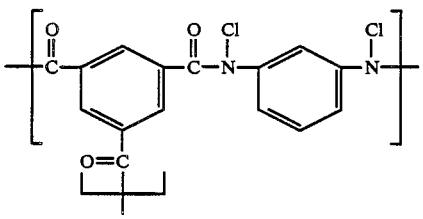

This deliberate chlorination of the membrane is required in order to improve the performance of said membrane in subsequent desalination operations. The patent also states that when the membrane of the reference was not fabricated under optimum amine and acyl halide concentrations, the salt rejection, even after the deliberate chlorination treatment, ranged from 88 to 97% and that even this loss of salt rejection capability can be minimized or avoided through modification of the polyamine; e.g., by acylation, alkylation, aldehyde condensation and other reactions which replace the amide hydrogen atoms with cross-links or other functional groups besides hydrogen. The focus of the patent therefore is on the modification of the amide portion of the membrane which is in contradistinction to the modification of the aromatic portion of the membrane which is produced according to the present invention. This modification of the aromatic portion of the membrane may be illustrated by the following formula:

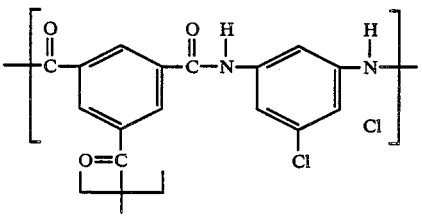

In this formula, it is to be noted that the chlorine substituent is on the aromatic ring portion of the polyamine, the dotted lines connecting the chlorine substituent to the ring indicating that the chlorine may be either in the 4 or 5 position depending upon the particular compound which has been chosen as one of the components of the desired membrane.

Another U.S. patent, namely U.S. Pat. No. 3,948,823, discloses the preparation of membranes from blends of preformed polymers. These membranes comprise a vastly different concept from the membranes of the present invention which are prepared by an interfacial condensation polymerization of reactive monomers on the surface of an inert support polymer. The polymers which are taught by this reference are not soluble in solvents which are compatible with the support polymers utilized in the present invention. Therefore, an attempt to cast a solution of a polymer as taught by this patent on the surface of a support polymer which is utilized in the present invention would result in the dissolution of the support polymer rather than in the formation of a composite membrane which is the present invention.

In contradistinction to what has been taught in the prior patents and this specification, we have now discovered that semipermeable membranes which possess the desirable characteristics of high salt rejection, good flux and high resistance to chlorine may be prepared in an interfacial polymerization reaction utilizing an aromatic polycarboxylic acid chloride and an aromatic polyamine in which the chlorine may be situated on a carbon atom adjacent to a primary amine group as the reactive components.

SUMMARY OF THE INVENTION

This invention relates to a process for the preparation of reverse osmosis membranes and to the use thereof in a desalination process. More specifically, the invention is concerned with a process for the preparation of reverse osmosis membranes which exhibit an extreme resistance to chlorine degradation.

As was previously discussed, the use of reverse osmosis membranes for the separation of liquid from liquid or solids from liquids are important articles of commerce. This is especially true in the area of desalination whereby water which is brackish or saline in nature may be rendered potable or suitable for use in other industrial or agricultural regions by passing the water through reverse osmosis membranes. In many instances a chlorine containing compound such as various chloroamines, hypochlorites or chlorine dioxide are added to saline water as a disinfectant or for antibacterial purposes. The saline water is then treated by aeration or chemically prior to desalination to remove the chlorine-containing compound. However, in many instances the complete removal is not effected and a relatively small but harmless amount of the compound will remain in the water. The presence of the chlorine-containing compound in the water to be desalinated will constitute a threat to the efficiency and long life of most reverse osmosis membranes. However, it has now been discovered that membranes prepared according to the process hereinafter set forth in greater detail and used in accordance with the process of desalination will be resistant to chlorine attack and thus may be used for a longer period of time than other membranes while maintaining the desirable properties of salt rejection and flux.

The particular membranes which constitute the inventive feature of the present application will comprise the reaction product resulting from the reaction of a aromatic polyamine and an aromatic polycarboxylic acid chloride, said membrane being composited or coated on a porous support backing material. By utilizing these membranes in a desalination process, it is possible to treat a saline or brackish water source over a relatively long period of time without replacement of the membrane, the long life of the membrane being, in part, due to the resistance to degradation resulting from exposure to chlorine in the water source.

It is therefore an object of this invention to provide a process for the preparation of a reverse osmosis membrane, suitable for use in separation processes, which possesses desirable characteristics.

Another object of this invention is to provide a process for the desalination of saline water utilizing reverse osmosis membranes prepared according to the process of this invention.

A further object of this invention is to provide a process for preparing a semipermeable membrane which is resistant to chlorine, thus rendering the membrane suitable for use in separation processes such as desalination of water where chlorine is present in an amount sufficient to degrade other types of membranes.

In one aspect, an embodiment of this invention resides in a process for the preparation of a chlorine-resistant semipermeable membrane which comprises casting a solution of an aromatic polyamine selected from the group consisting of 4-chloro-m-phenylenediamine, 5-chloro-m-phenylenediamine and mixtures thereof on a porous support backing material, removing excess solution, contacting said coated support material with an organic solvent solution of an aromatic polycarboxylic acid chloride to form an interfacial condensation reaction product membrane on the surface of said porous backing material, curing the resultant composite at curing conditions, and recovering the resultant chlorine-resistant semipermeable membrane.

Another embodiment of this invention resides in a process for the desalination of a saline water feedstream which comprises contacting said feedstream with the upstream face of a chlorine-resistant semipermeable membrane comprising a porous support backing material having supported thereon an interfacial polymerized condensation reaction product formed by the process of reacting together an aromatic polyamine containing a chlorine substituent on the aromatic ring selected from the group consisting of 4-chloro-m-phenylenediamine, 5-chloro-m-phenylenediamine, and mixtures thereof and an aromatic polycarboxylic acid chloride at separation conditions and recovering the permeate comprising the resultant desalinated water downstream subsequent to passage through said membrane.

A specific embodiment of this invention resides in a process for the preparation of a chlorine-resistant semipermeable membrane which comprises casting an aqueous solution of 4-chloro-m-phenylenediamine or 5-chloro-m-phenylenediamine on a porous backing support material comprising polysulfone, removing excess solution, contacting said coated polysulfone with a hexane solution of trimesoyl chloride to form an interfacial polymerized condensation reaction product membrane on the surface of said polysulfone, curing the resultant composite at a temperature in the range of from about 25° to about 150° C. for a period of time in the range of from about 10 minutes to about two hours, and recovering the resultant chlorine-resistant semipermeable membrane.

Other objects and embodiments will be found in the following further detailed description of the invention.

DETAILED DESCRIPTION OF THE INVENTION

As hereinbefore set forth, the present invention is concerned with semipermeable membranes which are resistant to chlorine. The membranes are prepared by casting an aqueous solution of an aromatic polyamine which contains a chlorine substituent on the aromatic ring of the compound on a porous backing support material, removing excess solution, and thereafter contacting the coated support material with an organic solvent solution of an aromatic polycarboxylic acid chloride. The organic solvent which is used to prepare the solution of the aromatic polycarboxylic acid chloride is immiscible with the aqueous solution, thus permitting the formation of an interfacial polymerized condensation reaction product on the surface of the support material. The resulting composite is then cured to provide a semipermeable membrane which exhibits favorable characteristics with respect to salt rejection and flux as well as resistance to chlorine.

As was previously discussed, the production of such a membrane which possesses these desirable characteristics was totally unexpected in view of the prior references which have indicated that it was highly unlikely that a compound such as an aromatic polyamine which contains a substituent on the aromatic ring in a position ortho to an amine group will result in the formation of a suitable polymeric membrane. It was heretofore believed that this interfering substituent on the aromatic ring in the ortho position was said to be detrimental even if the size of the substituent was as small as a methyl group and that said group would be likely to detract from the performance of a resulting polymer. In contradistinction to the thoughts of prior researchers, we have now discovered that the presence of a chlorine moiety as a substituent on the aromatic ring of an aromatic polyamine which is substantially similar in size to a methyl moiety, is not detrimental to the formation of a suitable membrane. As will hereinafter be shown in the examples at the end of the specification, the membrane of the present invention which is formed according to the process of the present invention from the interfacial polymerization of an aromatic polyamine containing a chlorine substituent on the aromatic ring in a position either ortho or meta to an amine substituent and an aromatic polycarboxylic acid chloride will possess chlorine-resistant properties which are either equal to or superior to other membranes which are not formed from the reaction of these two components and which will exhibit a resistance to chlorine. In addition, the membranes formed by the process of the present invention will not require further modification or treatment, such as that taught in a prior patent, to enhance the desired properties of the membrane.

The aromatic polyamines containing a chlorine substituent on the aromatic ring which comprise one component of the product of the present invention will comprise either 4-chloro-m-phenylenediamine or 5-chloro-m-phenylenediamine, or mixtures thereof. It is also contemplated with the scope of this invention that aromatic polyamines containing a chlorine substituent on the aromatic ring in which the amine moieties are in a position para to each other may also be employed, however not necessarily will equivalent results. The aromatic polycarboxylic acid chloride which forms the other component necessary to form the interfacial polymerization product will comprise either di- or tricarboxylic acid chloride such as trimesoyl chloride (1,3,5-benzene tricarboxylic acid chloride), isophthaloyl chloride, terephthaloyl chloride as well as mixtures of trimesoyl chloride and the isomeric phthaloyl chlorides.

In one embodiment, the chlorine-resistant semipermeable membranes formed by the process of the present invention may be prepared by coating the porous support backing material with an aqueous solution of the aromatic polyamine containing a chlorine substituent on the aromatic ring. As was previously set forth, the porous support backing material comprises a polymeric material containing pore sizes which are sufficient to permit the passage of permeate therethrough but are not large enough so as to interfere with the bridging over of the resulting ultrathin reverse osmosis membrane. In the preferred embodiment of the invention, the pore sizes of the porous support backing material will range from about 1 to about 1000 millimicrons inasmuch as pores which are larger than 1000 millimicrons will permit the ultrathin reverse osmosis membrane to sag into the pore, thus disrupting the flat sheet configuration which is a desirable characteristic of the membrane. Examples of porous support backing material which may be used to prepare the desired membrane composite will include such as polymers as polysulfone, polycarbonate, microporous polypropylene, the various polyamides, polyphenylene ether, etc.

The porous support backing material is coated with an aqueous solution of the aromatic amine containing a chlorine substituent on the aromatic ring utilizing either a hand casing or continuous operation. The solution which is utilized as the carrier for the aromatic amine containing a chlorine substituent on the aromatic ring will be 100% water or 100% acetonitrile or intermediate mixtures of water and acetonitrile. In the preferred embodiment of the invention, the aromatic amine containing a chlorine substituent on the aromatic ring will be present in the solution in an amount in the range of from about 0.1 to about 5% by weight of the solution. In addition, it is also contemplated within the scope of this invention that the solution may also contain additional components which, while not entering into the reaction, provide additional assistance in formulating the desired interfacial polymerization reaction product. Examples of these additives which may be present will include surfactants including ionic surfactants such as sodium lauryl sulfate, lower molecular weight alcohols such as methanol, ethanol, ethylene glycol, the isomeric propanols, butanols, or nonionic surfactants such as polyethylene glycol, polypropylene glycol, copolymers of ethylene glycol and propylene glycol, etc. In addition, the aqueous solution may also contain basic acid scavengers such as sodium hydroxide, potassium hydroxide, sodium carbonate, potassium carbonate, etc.

After coating the porous support backing material with the solution of the aromatic amine containing a chlorine substituent on the aromatic ring, the excess solution is drained and the coated support material is then contacted with an organic solvent solution of the aromatic polycarboxylic acid chloride. Again, in the preferred embodiment of the invention, the aromatic polycarboxylic acid chloride is present in the organic solvent solution in a range of from about 0.1 to about 5% by weight of the solution. The organic solvents which are employed in the process of this invention will comprise paraffins such as n-pentane, n-hexane, n-heptane, cyclopentane, cyclohexane, methylcyclopentane, etc. or, a halogenated solvent such as trichlorotrifluoroethane.

Inasmuch as the organic solvent and the solvent for the aromatic amine containing a chlorine substituent on the aromatic ring are substantially immiscible or incompatible, the polymerization of the two components of the membrane will occur substantially only at the interface between the solvent phases and thus an interfacially polymerized reaction product comprising a thin film membrane will be formed thereat. The contact time required for the formation of the thin film membrane will fluctuate over a relatively wide range of from about 1 second to about 60 seconds. Following the formation of the interfacially polymerized reaction product on the surface of the porous support backing material, the resultant composite may be cured to remove any remaining solvent and firmly affix the thin film membrane on the surface of the support. The curing of the composite membrane may be effected over a wide temperature range, said temperature being from ambient (20°–25° C.) up to about 150° C. for a period of time ranging from about 1 minute to about 2 hours or more in duration. The operating parameters of time and temperature will be interdependent, the primary criteria for the curing of the membrane being that said curing time is sufficient to provide the desired membrane but being insufficient to affect the desired characteristics of the thin film membrane and the porous backing support material. For example, excessive heat or curing time may affect the pore size of the backing material, thus resulting in a deacrease of the desired flux rate of the membrane.

It is also contemplated within the scope of this invention that the chlorine-resistant semipermeable membrane may be prepared in a continuous manner of operation. When this type of operation is employed, a porous support backing material of the type hereinbefore set forth in greater detail is continuously passed through a bath of an aqueous solution of the aromatic polyamine containing a chlorine substituent on the aromatic ring, said solution also containing, if so desired, a surfactant and an acid scavenger. After passage through the bath, the backing material is continuously withdrawn and, if so desired, passed between rollers in order to remove any excess solution which may be present. The coated support material is then also continuously passed through the solution of the aromatic polycarboxylic acid chloride in an organic solvent. The interfacial polymerization reaction will occur during the contact time between the solutions following which the composite comprising the interfacial polymerized reaction product in the form of a thin film semipermeable membrane on the porous support backing material will then be cured as, for example, by passage through an oven which is maintained at a desired curing temperature, the passage through said oven being at a predetermined rate so as to avoid any possible damage to the composite membrane.

The separation process involving the desalination of sea water or brackish water as well as other treatments of water such as softening of hard water whereby salts are removed, concentration of whey, etc. is effected in a reverse osmosis type separation. The reverse osmosis system or apparatus which is employed to effect the separation may comprise any of the various types of reverse osmosis apparatus which are known in the art. The membranes which are employed in this system are in the form of flat sheets which are particularly applicable for use in reverse osmosis modules either in a single sheet or in multiple sheet units whereby the sheet or sheets are wound in a spiral type configuration. In the preferred embodiment of the invention, the separation process is employed in a continuous type of operation in which the water is charged from a reservoir containing the same in a feedstream which contacts the upstream face of the chlorine-resistant semipermeable membrane of the present invention. Passage through this membrane results in producing a permeate and a retentate, the permeate comprising the desalinated water while the retentate comprises the unwanted salts or other contaminants present in the saline water feedstream. As was previously discussed, the saline water feedstream also contains a chlorine containing compound of the type previously set forth in greater detail which has been added as a disinfectant or as an antibacterial agent. The separation process is usually effected at separation conditions which may include a temperature in the range of from about ambient to about 50° C. and an applied pressure in the range of from about 1380 kPa (200 psi) to about 6895 kPa (1000 psi).

The following examples are given for purposes of illustrating the process for preparing chlorine-resistant semipermeable membranes and to their use thereof as separation agents. However, it is to be understood that these examples are provided merely for purposes of illustration and that the present invention is not necessarily limited thereto.

EXAMPLE I

A chlorine-resistant semipermeable membrane was prepared by handcasting a solution comprising 1.0% by weight of 4-chloro-m-phenylenediamine in a solvent comprising 97% of a 50/50 mixture of acetonitrile and water and 3% isopropanol on a 8" by 10" sheet of polysulfone at ambient temperature and pressure. The excess solution was drained after a period of 30 seconds, and the coated polysulfone contacted with a solution comprising 0.5% by weight of trimesoyl chloride in a hexane solvent. After a period of 30 seconds, the excess organic solvent was drained and the resultant semipermeable membrane composite was washed with water. Following this, the membrane composite, which may be designated as a poly(chlorophenylenediamine trimesamide), was then cured at a temperature of 70° C. for a period of 30 minutes.

A sample of the membrane prepared according to the above paragraph in a size of 1"×3" was placed in a cell and a synthetic sea water feed containing 5000 ppm of sodium chloride was passed across the surface of the membrane at a feed flow rate of 1.3 gal/min (GPM). The test conditions which were employed during the experiment included a pressure of 800 pounds per square inch (psi) on one side of the membrane while the other side of the membrane was maintained at atmospheric pressure. A temperature of 25° C. was maintained throughout the experiment while keeping the pH of the feed at 5.5. The permeate which was collected from the flowthrough was measured and it was found that there was a 93.5% rejection of sodium chloride at a flux rate of 8.6 GFD.

EXAMPLE II

A membrane was prepared in a manner similar to that set forth in Example I above by contacting an 8"×10" sheet of polysulfone with a solution comprising 2.0% by weight of 4-chloro-m-phenylenediamine in a 97% water and 3% isopropanol solvent at ambient temperature and pressure for a period of 30 seconds. The excess solution was drained and the coated polysulfone support was contacted with an organic solution comprising 0.25% by weight of trimesoyl chloride in hexane. After allowing a contact period of 30 seconds, the resulting membrane composite was washed with water and dried at a temperature of 70° C. for a period of 30 minutes.

As in the previous example, a 1"×3" sample of the membrane prepared according to the above paragraph was placed in a cell and subjected to a feed similar in nature to that set forth in Example I above under conditions which were also similar in nature. Analysis of the permeate recovered from this experiment disclosed that there had been a 94% rejection of sodium chloride at a flux rate of 12.8 GFD.

When the above experiment was repeated by treating the polysulfone support with a 100% aqueous solution containing 0.025% by weight of sodium lauryl sulfate, and 1.0% by weight of 4-chloro-m-pheylenediamine followed by contact with an organic solution comprising 0.25% by weight of trimesoylchloride in hexane, the rsulting membrane composite showed a 93.7% rejection of sodium chloride at a flux rate of 9.3 GFD.

EXAMPLE III

In this example, a membrane composite was prepared by coating an 8"×10" sheet of polysulfone with a 100% aqueous solution containing 0.025% by weight of sodium lauryl sulfate, and 1.0% by weight of 5-chloro-m-phenylenediamine at ambient temperature and pressure for a period of 30 seconds, and then draining. The coated polysulfone was then contacted with an organic solution comprising 1.0% by weight of trimesoyl chloride in hexane, the contact being effected at ambient temperature and pressure for a period of 30 seconds. The resulting thin film interfacial polymerized condensation reaction product semipermeable membrane composited on polysulfone was then cured at a temperature of 70° C. for a period of 30 minutes.

As in the preceding examples, a 1"×3" sample of the thus prepared membrane was placed in a cell and subjected to a synthetic sea water feed containing 5000 ppm of sodium chloride. A charge to the surface of the membrane was effected at a pressure of 800 psi while maintaining the temperature at 25° C. and the pH of the feed at 5.5. Analysis of the permeate disclosed a 97.2% sodium chloride rejection at a flux rate of 19.6 GFD. A membrane similar in nature to that prepared in the first paragraph of this example was prepared using a similar technique. However, the organic solution which was employed to effect the interfacial polymerization on the surface of the polysulfone contained only 0.5% by weight of trimesoyl chloride. The membrane, when subjected to the action of a synthetic sea water feed under conditions similar to that hereinbefore set forth gave a 97.8% sodium chloride rejection at a flux of 22.5 GFD. Another sample of this membrane, when subjected to the action of a synthetic sea water feed comprising 35,000 ppm of sodium chloride, under similar conditions to those hereinbefore set forth, gave a 97.4% sodium chloride rejection at a flux rate of 10.9 GFD.

A similar membrane which was prepared utilizing only 0.25% by weight of trimesoyl chloride in hexane gave a 97.4% rejection of sodium chloride at a flux rate of 16.6 GFD.

EXAMPLE IV

In this example, a series of membranes were prepared by coating a polysulfone support with a 100% aqueous solution containing 0.025% by weight of sodium lauryl sulfate, and 1.0% by weight of 5-chloro-m-phenylenediamine for a period of 30 seconds. After draining the excess solution from the coated support, it was then contacted with an organic solution containing 0.1% by weight of trimesoyl chloride in hexane. After a contact time of 30 seconds had elapsed, the excess solution was removed and the membrane was cured in an oven at a temperature of 70° C. for a period of 30 minutes. Samples of each of the membranes thus prepared were subjected to the action of a feed comprising a synthetic sea water containing 5000 ppm of sodium chloride. The charge to the cell containing the membrane was effected at a pressure of 800 psi while maintaining a temperature of 25° C. Analysis of the permeate showed sodium chloide rejections of 97.6% and 99.0% at fluxes of 13.7 and 14.7 GFD, respectively.

When the above experiments were repeated by treating polysulfone supports with solutions comprising 1.0% by weight of 5-chloro-m-phenylenediamine in a 97% water and 3% ethanol solvent followed by contact with organic solutions comprising 0.1% by weight of trimesoyl chloride in hexane, the resulting membranes showed sodium chloride rejections of 98.4% and 98.8% at fluxes of 11.2 and 18.4 GFD, respectively.

EXAMPLE V

In this example, a membrane composite was prepared by coating an 8"×10" sheet of polysulfone with a 100% aqueous solution containing 0.025% by weight of sodium lauryl sulfate and 1.0% by weight of 5-chloro-m-phenylenediamine at ambient temperature and pressure. Contact was maintained for a period of 30 seconds, then the excess aqueous solution was drained. The coated polysulfone was then contacted with an organic solution comprising 0.45% by weight of trimesoyl chloride and 0.05% by weight of isophthaloyl chloride in hexane, the contact being effected at ambient temperature and pressure for a period of 30 seconds. The excess organic solution was removed by draining, and the resulting thin film interfacial polymerized condensation reaction product semipermeable membrane composited on polysulfone was then cured at a temperature of 70° C. for a period of 30 minutes.

As in preceding examples, a 1"×3" sample of the thus prepared membrane was placed in a cell and subjected to a synthetic sea water feed containing 5000 ppm of sodium chloride. A charge to the surface of the membrane was effected at a pressure of 800 psi while maintaining the temperature at 25° C. and the pH of the feed at 5.5. Analysis of the permeate disclosed a 93.4% rejection of sodium chloride at a flux rate of 24.3 GFD.

EXAMPLE VI

To illustrate the efficacy of a mixture of aromatic amines containing a chlorine substituent on the aromatic ring, a membrane composite was prepared by coating an 8"×10" sheet of polysulfone with a 100% aqueous solution containing 0.025% by weight of sodium lauryl sulfate, 0.50% by weight of 5-chloro-m-phenylenediamine, and 0.50% by weight of 4-chloro-m-phenylenediamine at ambient temperature and pressure. Contact was maintained for a period of 30 seconds, then the excess aqueous solution was drained. The coated polysulfone was then contacted with an organic solution comprising 0.5% by weight of trimesoyl chloride in hexane, the contact being effected at ambient temperature and pressure for a period of 30 seconds. The excess organic solution was removed by draining, and the resulting membrane composite was then cured at a temperature of 70° C. for a period of 30 minutes.

The membrane, when subjected to the action of a synthetic sea water feed under conditions similar to that hereinbefore set forth gave a 77.9% sodium chloride rejection at a flux rate of 11.96 GFD.

EXAMPLE VII

In this example, a membrane composite was prepared by coating an 8"×10" sheet of polysulfone with a 100% aqueous solution containing 0.025% by weight of sodium lauryl, 0.50% by weight of 5-chloro-m-phenylenediamine, and 0.50% by weight of 4-chloro-m-phenylenediamine at ambient temperature and pressure. Contact was maintained for a period of 30 seconds, after which the excess aqueous solution was removed by draining. The coated polysulfone was then contacted with an organic solution comprising 0.45% by weight of trimesoyl chloride and 0.05% by weight of isophthaloyl chloride in hexane, the contact being effected at ambient temperature and pressure for a period of 30 seconds. The excess organic solution was removed by draining, and the resulting membrane composite thus produced was then cured at a temperature of 70° C. for a period of 30 minutes.

As in preceding examples, a 1"×3" sample of the composite membrane was placed in a cell and subjected to a synthetic sea water feed containing 5000 ppm of sodium chloride. A charge to the surface of the membrane was effected at a pressure of 800 psi while maintaining the temperature at 25° C. and the pH of the feed at 5.5. Analysis of the permeate showed a sodium chloride rejection of 70.9% at a flux rate of 18.6 GFD.

EXAMPLE VIII

As a further example, a membrane was prepared using a continuous casting technique. The process was effected by continuously passing a sheet of polysulfone through a bath of 1.0% by weight of 4-chloro-m-phenylenediamine in a 50/50% solution of acetonitrile and water which contained 0.02% by weight of a surfactant comprising sodium lauryl sulfate. The rate of passage of the polysulfone sheet through the bath was effected at a speed of 0.33 feet per minute at atmospheric pressure and ambient temperature. The contact of the polysulfone sheet with the water-acetonitrile solution lasted for a period of 20 seconds. The sheet of coated polysulfone was continuously withdrawn and the excess aqueous solution was drained therefrom. Following this, the sheet was continuously passed through a bath of hexane which contained 1.0% by weight of trimesoyl chloride. The contact of the coated polysulfone sheet with the organic solution lasted for a period of 20 seconds. Thereafter the thin film semipermeable membrane composited on the surface of the polysulfone was recovered and subjected to a curing step in an oven at a temperature of 80° C. for a period of 30 minutes.

A 1"×3" sample of the thus prepared membrane was placed in a cell and a feedstock comprising a synthetic sea water feed which contained 5000 ppm of sodium chloride was passed over the surface of the membrane at a temperature of 25° C. and at a pressure of 800 psi on one side of the membrane, the other side of the membrane being maintained at atmospheric pressure. The permeate was analyzed and it was found that there had been a 97.9% rejection of the sodium chloride at a flux rate of 4.6 GFD.

A similar membrane which was prepared from a 100% aqueous solution containing 0.025% by weight of sodium lauryl sulfate, and 1.0% by weight of 4-chlorom-phenylenediamine which was contacted with an organic solution of hexane containing 1.0% by weight of trimesoyl chloride resulted in a membrane which, after having been cured at a temperature of 70° C. for a period of 45 minutes, gave a rejection of 97.1% of sodium chloride at a flux rate of 8.3 GFD.

EXAMPLE IX

In this example, a membrane was prepared by continuously passing a polysulfone sheet through a bath which comprised 2.0% by weight of 4-chloro-m-phenylenediamine in a solvent of a 50/50 mixture of acetonitrile and water at ambient temperature and pressure, the passage of the polysulfone sheet through the bath being effected at a rate of 0.33 ft./min. with a contact time of 20 seconds. The polysulfone sheet was continuously withdrawn from the bath and after excess solution had been drained, it was continuously charged to a hexane solution which contained 0.84% by weight of trimesoyl chloride and 0.16% by weight of isophthaloyl chloride. After a contact time of 20 seconds had been effected, the membrane composite was withdrawn and cured at a temperature of 70° C. for a period of 30 minutes.

A 1"×3" sample of the membrane prepared according to the above paragraph was subjected to a desalination reaction in a manner similar to that hereinbefore set forth utilizing a synthetic sea water feed containing 5000 ppm of sodium chloride. The feed was passed over the surface of the membrane at a rate of 1.3 GPM at a pressure of 800 psi and a temperature of 25° C. Analysis of the permeate which was recovered showed that there had been an 83.7% rejection of the sodium chloride at a flux rate of 4.7 GFD.

EXAMPLE X

As a further example, a membrane was prepared using a continuous casting technique. The process was effected by continuously passing a sheet of polysulfone through a bath of 0.6% by weight of 5-chloro-m-phenylenediamine in water which contained 20 ppm of a surfactant comprising sodium lauryl sulfate. The rate of passage of the polysulfone sheet through the bath was effected at a speed of 2.0 feet per minute at atmospheric pressure and ambient temperature. The contact time of the polysulfone sheet with the aqueous solution lasted for a period of 9 seconds. The sheet of coated polysulfone was continuously withdrawn and the excess aqueous solution was drained therefrom. Following this, the sheet was continuously passed through a bath of hexane which contained 0.5% by weight of trimesoyl chloride. The contact of the coated polysulfone sheet with the organic solution lasted for a period of 9 seconds. Thereafter, the thin film semipermeable membrane composited on the surface of the polysulfone was recovered and subjected to a curing step in an oven at a temperature of 72°±2° C.

A 1"×3" sample of the thus prepared membrane was placed in a cell and a feedstock comprising a synthetic sea water feed which contained 5000 ppm of sodium chloride was passed over the surface of the membrane at a temperature of 25° C., a pH of 5.5, and at a pressure of 800 psi applied on one side of the membrane, the other side of the membrane being maintained at atmospheric pressure. The feed flow rate was 1.3 GPM. The permeate was analyzed and it was found that there had been a 99.14% rejection of the sodium chloride at a flux rate of 8.1 GFD.

EXAMPLE XI

In this example, a membrane composite was prepared by a method similar to that taught in U.S. Pat. No. 4,277,344. An 8"×10" sheet of polysulfone was coated with an aqueous solution containing 1.0% by weight of m-phenylenediamine at ambient temperature and pressure for a period of 30 seconds. After draining the excess aqueous solution, the coated polysulfone was then contacted with an organic solution comprising 0.5% by weight of trimesoyl chloride in hexane, the contact being effected at ambient temperature and pressure for a period of 30 seconds. The resulting thin film interfacial polymerized condensation reaction product semipermeable membrane composited on polysulfone was then cured at a temperature of 70° C. for a period of 30 minutes, and was then evaluated as described in Example XII.

EXAMPLE XII

The effects of hypochlorite on the performances of composite membranes prepared in Examples VIII and XI were compared.

As in preceding examples, a 1"×3" sample of each composite membrane was placed in a cell and subjected to a synthetic sea water feed containing 5000 ppm of sodium chloride at a feed flow rate of 1.3 GPM. A charge to the surface of the membrane was effected at a pressure of 800 psi while maintaining the temperature at 25° C. and the pH of the feed at 5.5. After 1 hour under these test conditions, the permeate from each cell was analyzed.

Without removing the samples from the cells, hypochlorite was added to the above synthetic sea water feed to give an effective sodium hypochlorite concentration of 4 ppm. The membrane samples in the cells were then subjected to this hypochlorite containing feed under the same operating conditions described above. After 2 hours under these test conditions, the permeate from each cell was analyzed.

The membrane sample prepared according to Example VIII from 4-chloro-m-phenylenediamine and trimesoyl chloride showed increases in both sodium chloride rejection and flux rate, while the membrane sample prepared according to Example XI from m-phenylenediamine and trimesoyl chloride showed a smaller increase in sodium chloride rejection and a decrease in flux rate:

| Membrane Sample | Without Hypochlorite | | With Hypochlorite | |
|---|---|---|---|---|
| | Rejection (%) | Flux (GFD) | Rejection (%) | Flux (GFD) |
| Ex. VIII | 82 | 7.8 | 88 | 8.7 |
| Ex. XI | 94 | 22.1 | 95.2 | 16.3 |

EXAMPLE XIII

To demonstrate the effect of long term hypochlorite exposure on the performance of a composite membrane sample prepared in Example IV from 5-chloro-m-phenylenediamine in a solvent comprising 97% of water and 3% of ethanol, and trimesoyl chloride in hexane, the following experiment was performed.

As in previous examples, a 1"×3" sample of the thus prepared composite membrane was placed in a cell and subjected to a synthetic sea water feed containing 2000 ppm of sodium chloride at a feed flow rate of 1.3 GPM.

A charge to the surface of the membrane was effected at a pressure of 420 psi while maintaining the temperature at 25° C. and the pH of the feed at 5.7 to 5.9. Hypochlorite was introduced into the feed periodically as described in Example XII, with a total accumulated exposure of 1360 ppm-hours. The permeate from the cell was periodically analyzed for sodium chloride rejection and flux rate. Although flux rate was depressed during the hypochlorite exposure, it was restored after exposure to hypochlorite-free feed. Sodium chloride rejection exhibited a modest improvement after this treatment:

EXAMPLE XIII DATA TABLE

| Elapsed Time (hrs.) | Avg. Hypochlorite Conc. (ppm) | Cumulative Hypochlorite Exposure (ppm-hrs) | Rejection (%) | Flux (GFD) |
|---|---|---|---|---|
| 0–20 | 0 | 0 | 97.4 | 5.8 |
| 20–108 | 6.0 | 530 | — | — |
| 108–138 | 0 | 530 | 97.6 | 3.5 |
| 138–228 | 9.2 | 1360 | 97.3 | 3.5 |
| 228–304 | 0 | 1360 | 98.3 | 5.5 |

EXAMPLE XIV

To illustrate the fact that membranes could be prepared from a phenylenediamine containing a chlorine substituent on the aromatic ring which would be comparable in nature to those which did not contain a substituent on the aromatic ring of the phenylenediamine contrary to teachings of U.S. Pat. No. 4,277,344, a series of membranes were prepared according to the teachings of this patent and compared to membranes which were prepared according to the process of the present invention. The membranes of the present invention and those of the U.S. patent were subjected to a soak treatment of 1 ppm of hypochlorite for a period of 1 hour and a period of 16 hours. Following this, the membranes were subjected to a reverse osmosis treatment in a manner similar to that set forth in the above examples, the water feed containing 5000 ppm of sodium chloride at a feed flow rate of 1.3 GPM. The feed was charged to the surface of the membrane at a pressure of 800 psi while maintaining the temperature at 25° C. and the pH of the feed at 5.5. The results of this test are set forth in the Table below. In this Table, the membranes labeled A, B, and C are those membranes prepared according to the teachings of U.S. Pat. No. 4,277,344, and membranes D, E, and F are those which comprise the interfacial polymerized condensation reaction product of 5-chloro-m-phenylenediamine and trimesoyl chloride as described in Example IV of this application.

| Membrane | Soak Time Hours | % NaCl Rejection | Flux, GFD |
|---|---|---|---|
| A | — | 99.0 | 24.4 |
|   | 1 | 98.2 | 13.1 |
| B | — | 97.3 | 27.7 |
|   | 16 | 95.0 | 18.0 |
| C | — | 96.3 | 30.0 |
|   | 16 | 31.0 | 19.4 |
| D | — | 94.7 | 26.5 |
|   | 1 | 92.2 | 17.6 |
| E | — | 91.1 | 24.0 |
|   | 16 | 80.7 | 13.8 |
| F | — | 94.1 | 23.9 |
|   | 16 | 60.9 | 17.2 |

It is readily apparent from a review of the above table that, contrary to the teachings of the patent, a membrane could be prepared from a phenylenediamine containing a chlorine substituent on the aromatic ring and trimesoyl chloride which is comparable in nature to the membrane of the patent and that, contrary to the teachings of the patent in Examples XV and XVI thereof, discloses that the membrane of the patent exhibits both decreased salt rejection and decreased flux.

We claim as our invention:

1. A process for the preparation of a chlorine-resistant semipermeable membrane which comprises providing resistance to chlorine in desalination of saline water by casting a solution of an aromatic polyamine containing a chlorine substituent on the aromatic ring selected from the group consisting of 4-chloro-m-phenylenediamine, 5-chloro-m-phenylenediamine and mixtures thereof on a porous support backing material, removing excess solution, contacting said coated support material with an organic solvent solution of an aromatic polycarboxylic acid chloride to form an interfacial condensation reaction product membrane on the surface of said porous backing material, curing the resultant composite at curing conditions which include a temperature in the range of from about 25° to about 150° C. for a period of time in the range of from about 10 minutes to about 2 hours, and recovering the resultant chlorine-resistant semipermeable membrane.

2. The process as set forth in claim 1 in which said aromatic polyamine containing a chlorine substituent on the aromatic ring is 4-chloro-m-phenylenediamine.

3. The process as set forth in claim 1 in which said aromatic polyamine containing a chlorine substituent on the aromatic ring is 5-chloro-m-phenylenediamine.

4. The process as set forth in claim 1 in which said aromatic polyamine containing a chlorine substituent on the aromatic ring comprises a mixture of 4-chloro-m-phenylenediamine and 5-chloro-m-phenylenediamine.

5. The process as set forth in claim 1 in which said aromatic polycarboxylic acid chloride is selected from the group consisting of isophthaloyl chloride, terephthaloyl chloride, trimesoyl chloride and mixtures thereof.

6. The process as set forth in claim 1 in which said aromatic polyamine containing a chlorine substituent on the aromatic ring is present in said interfacial polymerized condensation reaction product in a weight ratio to said aromatic polycarboxylic acid chloride in a range of from about 0.1:1 to about 40:1.

7. The process as set forth in claim 1 in which said porous support backing material comprises polysulfone.

8. The process as set forth in claim 1 in which said porous support backing material comprises polycarbonate.

9. The process as set forth in claim 1 in which said porous support backing material comprises polyphenylene ether.

10. The process as set forth in claim 1 in which said porous support backing material comprises polyamide.

11. The process as set forth in claim 1 in which said aqueous solution of said aromatic polyamine containing a chlorine substituent on the aromatic ring may include an ionic or a nonionic surfactant.

12. The process as set forth in claim 1 in which said aqueous solution of said aromatic polyamine containing a chlorine substituent on the aromatic ring may contain an organic solvent which is miscible with water.

13. The process as set forth in claim 1 in which said organic solvent is immiscible with said aqueous solution.

14. The process as set forth in claim 1 in which said aromatic polyamine containing a chlorine substituent on the aromatic ring comprises 4-chloro-m-phenylenediamine and said aromatic polycarboxylic acid chloride comprises trimesoyl chloride.

15. The process as set forth in claim 1 in which said aromatic polyamine containing a chlorine substituent on the aromatic ring comprises 5-chloro-m-phenylenediamine and said aromatic polycarboxylic acid chloride comprises trimesoyl chloride.

16. The process as set forth in claim 1 in which said aromatic polyamine containing a chlorine substituent on the aromatic ring comprises 5-chloro-m-phenylenediamine and said aromatic polycarboxylic acid chloride comprises isophthaloyl chloride.

17. The process as set forth in claim 1 in which said aromatic polyamine containing a chlorine substituent on the aromatic ring comprises 4-chloro-m-phenylenediamine and said aromatic polycarboxylic acid chloride comprises terephthaloyl chloride.

18. The process as set forth in claim 1 in which said aromatic polyamine containing a chlorine substituent on the aromatic ring comprises a mixture of 4-chloro-m-phenylenediamine and 5-chloro-m-phenylenediamine and said aromatic polycarboxylic acid chloride comprises a mixture of trimesoyl chloride and isophthaloyl chloride.

19. A process for the desalination of a saline water feedstream which comprises contacting said feedstream with the upstream face of a chlorine-resistant semipermeable membrane comprising a porous support backing material having supported thereon an interfacial polymerized condensation reaction product formed by the process of reacting together an aromatic polyamine containing a chlorine substituent on the aromatic ring selected from the group consisting of 4-chloro-m-phenylenediamine, 5-chloro-m-phenylenediamine, and mixtures thereof and an aromatic polycarboxylic acid chloride at separation conditions and recovering the permeate comprising the resultant desalinated water downstream subsequent to passage through said membrane.

20. The process as set forth in claim 19 further characterized in that said saline water feedstream contains an added chlorine-containing compound.

21. The process as set forth in claim 20 in which said chlorine-containing compound comprises chloroamines.

22. The process as set forth in claim 20 in which said chlorine-containing compound comprises chlorine dioxide.

23. The process as set forth in claim 20 in which said chlorine-containing compound comprises hypochloride.

24. The process as set forth in claim 19 in which said separation conditions include a temperature in the range of from about ambient to about 50° C. and a pressure in the range of from about 1,380 kPa (200 psi) to about 6,895 kPa (1,000 psi).

25. The process as set forth in claim 19 in which said aromatic polyamine containing a chlorine substituent on the aromatic ring is present in said interfacially polymerized condensation reaction product in a weight ratio to said aromatic polycarboxylic acid chloride in a range of from about 0.1:1 to about 40:1.

26. The process as set forth in claim 19 in which said aromatic polyamine containing a chlorine substituent on the aromatic ring comprises 4-chloro-m-phenylenediamine and said aromatic polycarboxylic acid chloride comprises trimesoyl chloride.

27. The process as set forth in claim 19 in which said aromatic polyamine containing a chlorine substituent on the aromatic ring comprises 5-chloro-m-phenylenediamine and said aromatic polycarboxylic acid chloride comprises trimesoyl chloride.

28. The process as set forth in claim 19 in which said aromatic polyamine containing a chlorine substituent on the aromatic ring comprises a mixture of 4-chloro-m-phenylenediamine and 5-chloro-m-phenylenediamine and said aromatic polycarboxylic acid chloride comprises trimesoyl chloride.

29. The process as set forth in claim 19 in which said porous support backing material comprises polysulfone.

* * * * *

UNITED STATES PATENT AND TRADEMARK OFFICE
CERTIFICATE OF CORRECTION

PATENT NO. : 4,885,091
DATED : December 5, 1989
INVENTOR(S) : Raymond J. Swedo and Joseph J. Zupancic It is certified that error appears in the above-identified patent and that said Letters Patent is hereby corrected as shown below:

Title page: Related U.S. Application Data: "Ser. No. 686,497, Dec. 26, 1989, abandoned." should read --Ser. No. 686,497, Dec. 26, 1984 abandoned.

Abstract, line 7: "5-chlor-m-phenylenediamine" should read
-- 5-chloro-m-phenylenediamine--

Column 3, line 51: that part of the formula

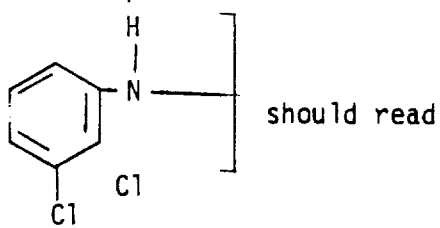 should read 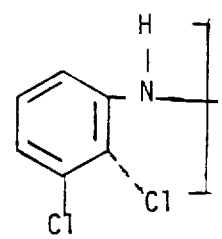

Column 6, line 54: "with the scope" should read --within the scope--
Column 6, line 58: "will equivalent" should read --with equivalent--
Column 7, line 24: "casing" should read --casting--.
Column 10, line 12: "trimesoylchloride" should read --trimesoyl chloride--

Signed and Sealed this

Twenty-third Day of October, 1990

*Attest:*

HARRY F. MANBECK, JR.

*Attesting Officer*   *Commissioner of Patents and Trademarks*